US011199931B2

(12) United States Patent
Cobanoglu et al.

(10) Patent No.: US 11,199,931 B2
(45) Date of Patent: Dec. 14, 2021

(54) CAPACITIVE TOUCH SENSOR

(71) Applicant: Sanko Tekstil Isletmeleri San. Ve Tic. A.S., Inegol-Bursa (TR)

(72) Inventors: Ozgur Cobanoglu, Inegol-Bursa (TR); Jitka Eryilmaz, Inegol-Bursa (TR); Ece Senel, Inegol-Bursa (TR); Deniz Iyidogan, Inegol-Bursa (TR); Semih Kazanc, Inegol-Bursa (TR); Erdogan Baris Ozden, Inegol-Bursa (TR)

(73) Assignee: Sanko Tekstil Isletmeleri San. Ve Tic. A.S., Inegol-Bursa (TR)

( * ) Notice: Subject to any disclaimer, the term of this patent is extended or adjusted under 35 U.S.C. 154(b) by 0 days.

(21) Appl. No.: 16/823,764

(22) Filed: Mar. 19, 2020

(65) Prior Publication Data

US 2020/0301529 A1 Sep. 24, 2020

(30) Foreign Application Priority Data

Mar. 22, 2019 (EP) ..................................... 19164695

(51) Int. Cl.
*G06F 3/044* (2006.01)
(52) U.S. Cl.
CPC .... *G06F 3/044* (2013.01); *G06F 2203/04103* (2013.01)
(58) Field of Classification Search
CPC ...... G06F 3/044; G06F 3/0412; G06F 3/0446; G06F 3/0416; G06F 3/041; G06F 2203/04103
See application file for complete search history.

(56) References Cited

U.S. PATENT DOCUMENTS

| | | | | |
|---|---|---|---|---|
| 9,232,637 | B2* | 1/2016 | Van Abeelen | H05K 1/0283 |
| 10,273,600 | B1* | 4/2019 | Bharadwaj | G02F 1/134309 |
| 2003/0211797 | A1* | 11/2003 | Hill | H05K 1/189 |
| | | | | 442/205 |
| 2006/0007059 | A1* | 1/2006 | Bell | G06F 1/163 |
| | | | | 345/55 |

(Continued)

FOREIGN PATENT DOCUMENTS

WO 2007094993 8/2007

OTHER PUBLICATIONS

Lee et al., "Flexible Graphene Woven Fabrics for TOuch Sensing", Applied Physics Letters, vol. 102, No. 16, Apr. 25, 2013.*

(Continued)

*Primary Examiner* — Olga V Merkoulova
(74) *Attorney, Agent, or Firm* — Silvia Salvadori

(57) ABSTRACT

It is disclosed a capacitive touch sensor (10) comprising a support layer (1) having a plurality of sensing threadlike elements (2) coupled thereto and configured to be electrically connected to a detection device (5) for evaluating the capacitance value (C) of each sensing threadlike element (2) of said plurality of sensing threadlike elements, characterized in that said sensing threadlike elements (2) comprise a plurality of electrically resistive threadlike elements (2r), wherein the electrical resistance per unit of length of each electrically resistive threadlike element (2r) is comprised between 10 kΩ/m and 10 MΩ/m. An article comprising the capacitive touch sensor (10) and a method for detecting a touch event on a support layer (1) are also disclosed.

17 Claims, 4 Drawing Sheets

(56) References Cited

U.S. PATENT DOCUMENTS

| | | | |
|---|---|---|---|
| 2008/0196940 A1* | 8/2008 | Stobbe | D03D 15/00 174/70 R |
| 2008/0218369 A1* | 9/2008 | Krans | H01L 51/0097 340/691.1 |
| 2008/0233822 A1* | 9/2008 | Swallow | H05K 3/10 442/185 |
| 2010/0208445 A1* | 8/2010 | Asvadi | H05K 1/189 361/809 |
| 2012/0327654 A1* | 12/2012 | Bhattacharya | D04B 1/14 362/235 |
| 2015/0019013 A1* | 1/2015 | Rose | B25J 15/10 700/258 |
| 2015/0091859 A1* | 4/2015 | Rosenberg | G06F 3/0445 345/174 |
| 2015/0124566 A1* | 5/2015 | Lake | G04G 21/08 368/10 |
| 2015/0177436 A1* | 6/2015 | Zimmermann | D03D 1/00 362/510 |
| 2016/0320037 A1* | 11/2016 | Wong | H05K 1/038 |
| 2018/0046359 A1* | 2/2018 | Kim | G06F 3/0414 |
| 2018/0059867 A1* | 3/2018 | Malhotra | G06F 3/0418 |
| 2018/0195210 A1* | 7/2018 | Sunshine | D02G 3/441 |
| 2018/0217715 A1 | 8/2018 | Cobanoglu et al. | |
| 2019/0013274 A1* | 1/2019 | Sunshine | D03D 11/02 |
| 2019/0013275 A1* | 1/2019 | Sunshine | D02G 3/441 |
| 2019/0088382 A1* | 3/2019 | Allen | A61B 5/6804 |
| 2020/0150828 A1* | 5/2020 | Kim | G06F 3/0416 |

OTHER PUBLICATIONS

European Search Report issued by the EPO dated Oct. 16, 2019 for priority EP application No. 19164695.9.

International Search Report issued by the EPO dated Jun. 16, 2020 for corresponding International application No. PCT/EP2020/057759.

European Search Report issued by the EPO dated Jul. 15, 2020 for correspoding EP application No. 20164486.1.

\* cited by examiner

CAPACITIVE TOUCH SENSOR

This application claims priority to and the benefit of European Application No. 19164695.9 filed on Mar. 22, 2019, the content of which is incorporated herein by reference in its entirety.

TECHNICAL FIELD

The present invention relates to the field of the capacitive sensing. In particular, the present invention relates to a capacitive touch sensor suitable for detecting touch events on a support layer, for example a fabric.

BACKGROUND

Typically capacitive touch sensors comprise a plurality of sensing wires made of an electrically conductive material such as metal (e.g. copper, aluminum, silver). Sensing wires are electrically insulated from each other, and arranged in rows and columns to form a capacitive grid.

Some capacitive touch sensors employ the "Self-Capacitance Sensing" technique wherein each sensing wire is connected to a controller configured to evaluate the capacitance value of each sensing wire, i.e. independently to each other. In these capacitive touch sensors, the controller is configured to detect the change of value in the capacitance of each sensing wire due to the parasitic capacitance provided by an object (e.g. a finger) touching the sensing wire. The position of a touch event is determined by the controller by detecting which sensing wires (i.e. which rows and columns) of the capacitive grid are touched, so that the position of the touch is determined as X, Y coordinates on the capacitive grid.

However, this kind of touch sensor is unable to detect accurately more than one finger (multi-touch detection), which results in "ghosting", or misplaced location sensing. In order to solve the "ghosting" problem for a multi-touch detection, some capacitive touch sensors employ the "Mutual Capacitance Sensing" technique wherein the controller is configured to evaluate sequentially the mutual capacitance value at each intersection of sensing wires. In other words, the controller is configured to evaluate the capacitance value of each capacitor formed between sensing wires for each row and each column of the capacitive grid. A touch of an object (e.g. a finger) on the capacitive grid is detected as a change of value in the mutual capacitance. However, when the capacitive grid has a great number of sensing wires (for example if a wide sensing area of the touch sensor is desired), the implementation of such capacitive touch sensor may be very challenging. Furthermore, such capacitive touch sensor may need of high frequency clock and high accuracy in measurement due to the reduced value of mutual capacitance.

Document US 2018/217715 describes a stretchable touchpad of the capacitive type including a stretchable textile fabric having a plurality of conductive elements incorporated therein. The conductive elements are resistive strain gauges which form electrodes to detect a change of capacitance caused by a touch. It is also disclosed a method for operating a stretchable touchpad comprising the steps of measuring continuously a capacitance analog signal provided by a resistive strain gauge of the stretchable touchpad; and comparing the measured capacitance signal with a threshold value in order to determine whether or not a touch has taken place, wherein the threshold value is continuously adjusted as a function of the actual measurement of capacitance and as a function of the resistance of said resistive strain gauges which form the capacitor electrodes of said touchpad.

Document WO 2007/094993 discloses a flexible, resilient capacitive sensor suitable for large-scale manufacturing. The sensor comprises a dielectric, an electrically conductive layer on the first side of the dielectric layer, an electrically conductive layer on a second side of the dielectric layer, and a capacitance meter electrically connected to the two conductive layers to detect changes in capacitance upon application of a force to the detector. The conductive layers are configured to determine the position of the applied force. The sensor may be shielded to reduce the effects of outside interference.

SUMMARY OF THE INVENTION

An object of the present invention is to overcome the drawbacks of the prior art cited above and to provide a capacitive touch sensor and a relating method for detecting a touch event simple to be produced, efficient and versatile.

A further object of the present invention is to provide a capacitive touch sensor and a relating method for detecting a touch event that allow multi-touch detection with a low cost of production.

A further object of the present invention is to provide a fabric having a capacitive touch sensor more washable, less heavy, and more bio-compatible with respect to the capacitive touch sensor known in the art.

These and other objects are achieved by the present invention by a capacitive touch sensor, an article comprising such a capacitive touch sensor, and a method for detecting a touch event according to one or more of the attached claims.

In particular, these and other objects are achieved by the present invention by a capacitive touch sensor, an article comprising such a capacitive touch sensor, and a method for detecting a touch event according to the independent claims. Preferred aspects of the invention are recited in dependent claims.

According to the present invention, the capacitive touch sensor comprises a support layer having a plurality of sensing threadlike elements configured to be electrically connected to a detection device for evaluating the capacitance value of each sensing threadlike element.

For example, the support layer may be a flexible layer (for example a film) having the sensing threadlike elements coupled on its surface, or integrated therein. Other embodiments may provide that the support layer is a composite layer having the sensing threadlike elements sandwiched between two layers of the composite layer. A preferred embodiment may provide that the support layer is a fabric. For example a fabric produced by weaving, knitting, crocheting, knotting, tatting, felting, or braiding, or a nonwoven fabric having sensing threadlike elements coupled on its surface, or integrated therein.

According to an aspect of the present invention, the sensing threadlike elements comprise a plurality of electrically resistive threadlike elements, wherein the electrical resistance per unit of length of each electrically resistive threadlike element is comprised between 10 kΩ/m and 10 MΩ/m, preferably comprised between 50 kΩ/m and 500 kΩ/m.

According to a further aspect of the present invention, the electrically resistive threadlike elements are plastic yarns filled with electrically conductive elements.

The term "threadlike element" means an element having a shape similar to a thread. In general, in a threadlike element two of the three dimensions are much lower than and generally negligible with respect to the third dimension. For example, a threadlike element may have the shape of a strip having width and thickness negligible with respect to the length. Preferably, sensing threadlike element have two of the three dimensions comparable between them and negligible with respect to the third dimension (ideally a line). For example, sensing threadlike elements may be wires, yarns, filaments or traces of material arranged along a linear path.

For example, the electrical resistance per unit of length may be measured by following the standard AATCC Test Method 84-2005 or AATCC Test Method 84-2011.

Each sensing threadlike element is configured to be electrically connected at one of its ends to the detection device. In particular, the detection device is provided with a plurality of input reading nodes configured to be electrically connected to the sensing threadlike elements (each input reading node is associated to a respective sensing threadlike element). The detection device is configured to provide an output signal that indicates the capacitance value of each sensing threadlike element electrically connected to the correspondent input reading node.

Each electrically resistive threadlike element has a capacitance value that changes when an object touches it (a parasitic capacitance of the object is coupled to the touched electrically resistive threadlike element). The change in capacitance value of an electrically resistive threadlike element is function of two main aspects: the parasitic capacitive coupling between the electrically resistive threadlike element and the object touching it, and the location on which the touching event occurred along the length of the resistive threadlike element with respect to the read-out point (i.e. with respect to the point on which the electrically resistive threadlike element is electrically connected to the detection device).

Basically, each electrically resistive threadlike element can be represented with a lumped model of a capacitor in series with a resistor having a resistance value depending on the position of the touch event (i.e. the position on which the parasitic capacitance of the object is applied to the electrically resistive threadlike element). Thanks to this aspect, the capacitance value evaluated at the reading node of each electrically resistive threadlike element provides an indication of the position of a touch event with respect to the position of the reading node, as well as an indication that a touch event occurred in the electrically resistive threadlike element.

According to an aspect of the present invention, the electrically resistive threadlike element comprise at least a trace of electrically resistive material arranged along a substantially linear path.

According to another aspect of the invention, the traces of electrically resistive material comprise a biopolymer including electrically conductive carbonaceous material, preferably selected from the group consisting of activated carbon, high surface area carbon, graphene, graphite, activated charcoal, carbon nanotubes, carbon nanofibers, activated carbon fibers, graphite fibers, graphite nanofibers, carbon black and mixtures thereof.

According to an aspect of the present invention, the number of the electrically resistive threadlike elements is different from 50% of the number of the sensing threadlike elements. In particular, some embodiments may provide that the sensing threadlike elements comprise one or more electrically conductive threadlike elements, as well as the plurality of electrically resistive threadlike elements, wherein the electrical resistance per unit of length of each electrically conductive threadlike element is less than 200 $\Omega$/m, preferably less than 50 $\Omega$/m, more preferably less than or equal to about 10 $\Omega$/m. These embodiments preferably provides that the number of electrically conductive threadlike elements is different from the number of electrically resistive threadlike elements. For example, the electrically resistive threadlike elements may be more than 50% of the plurality of sensing threadlike elements, preferably more than 80%, more preferably all the sensing threadlike elements are electrically resistive threadlike elements.

Some embodiments may provide that sensing threadlike elements comprises a first array of electrically resistive threadlike elements arranged parallel to each other. Preferably, sensing threadlike elements further comprises a second array of electrically resistive threadlike elements arranged parallel to each other and orthogonal to the electrically resistive threadlike elements of the first array. More preferably, the first array of electrically resistive threadlike elements and the second array of electrically resistive threadlike elements overlap to form a grid.

Advantageously, the electrically resistive threadlike elements of the first array and of the second array are electrically shorted at the crossing there between.

Preferably, the support layer of the capacitive touch sensor is a woven fabric, wherein the plurality of sensing threadlike elements form at least a part of the weft and/or of the warp of the woven fabric.

According to an aspect of the present invention, each sensing threadlike element is electrically connected at one of its ends to the detection device.

Some embodiments may provide that the detection device is configured to provide an output signal that indicates the direct or indirect measurement of the capacitance value of each sensing threadlike element.

Some embodiments of the present invention may provide that the detection device is connected to a communication module configured to transmit the output signal to an external device (e.g. a smartphone, a smart TV, or other similar devices).

A further object of the present invention is an article comprising the capacitive touch sensor according to the present invention. The article may be for example a garment.

Preferably, the article comprises the detection device for evaluating the capacitance values of the sensing threadlike elements.

A further object of the present invention is a method for detecting a touch event on a support layer comprising the following steps:
(a) providing a capacitive touch sensor according to anyone of the embodiments of the present invention;
(b) evaluating the capacitance of each sensing threadlike element of the touch sensor;
(c) providing an output signal comprising one or more output values that are a function of the capacitance evaluated in the step (b).

Preferably, the step (b) comprises a direct or indirect measuring of the capacitance Some embodiments may provide that the method according to the present invention comprises a step of transmitting the output signal to an external device.

BRIEF DESCRIPTION OF THE DRAWINGS

The invention will now be described in greater detail, by way of example, with reference to the accompanying non limiting drawings. It is emphasized that, according to common practice, the various features of the drawing are not necessarily to scale. On the contrary, the dimensions of the various features are arbitrarily expanded or reduced for clarity. Like numerals denote like features throughout the specification and the drawings in which.

DETAILED DESCRIPTION

Figure 1:
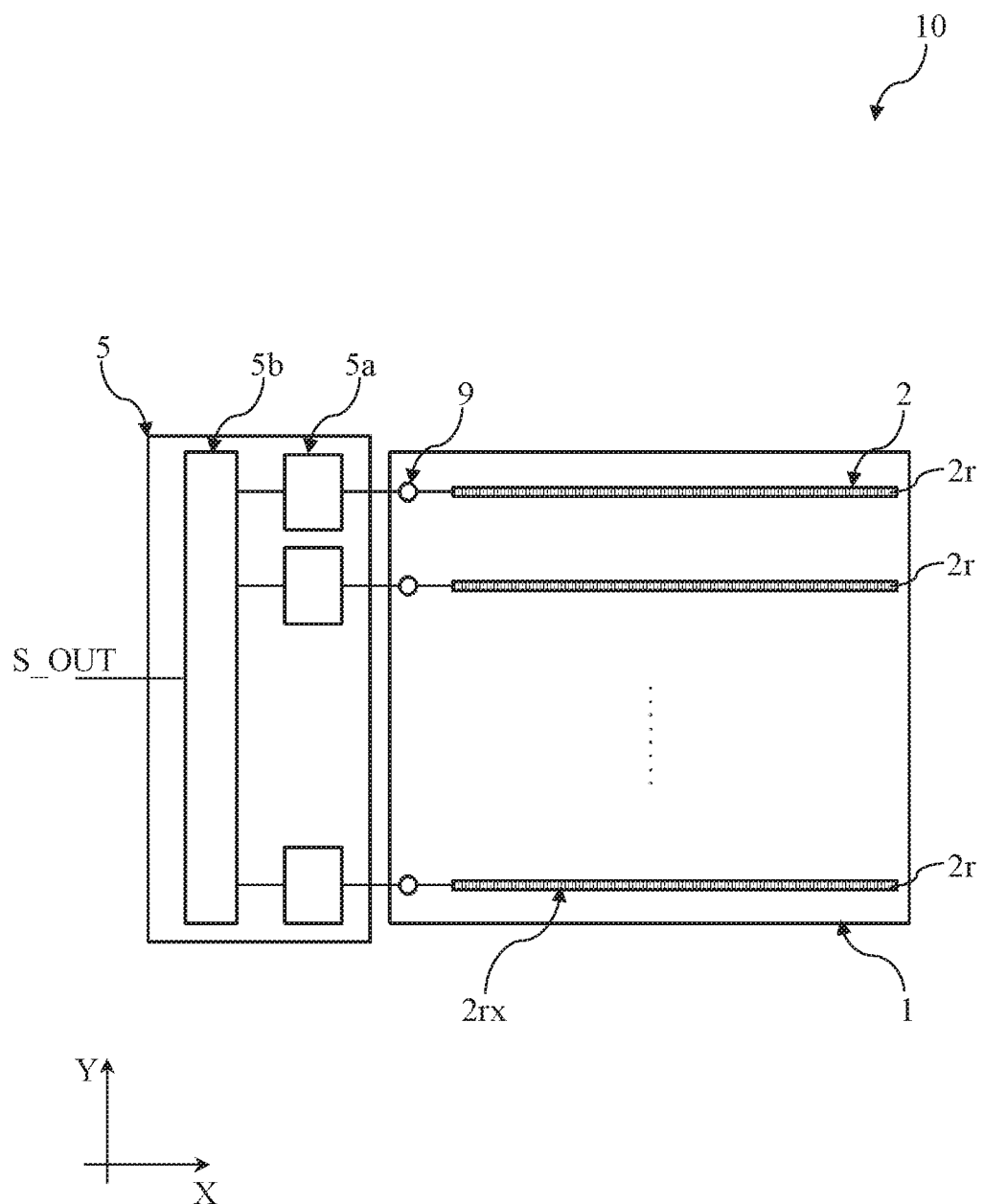
FIGS. 1-5 are perspective view that schematically show possible embodiments of a capacitive touch sensor according to the present invention.

FIGS. 1-5 show exemplary embodiments of a capacitive touch sensor 10 according to the present invention. The capacitive touch sensor comprises a support layer 1 and a plurality of sensing threadlike elements 2 coupled to the support layer 1.

Sensing threadlike elements 2 comprise a plurality of electrically resistive threadlike elements 2r, wherein the electrical resistance per unit of length Rr of each electrically resistive threadlike element 2r is comprised between 10 kΩ/m and 10 MΩ/m. Preferably, each electrically resistive threadlike element 2r has an electrical resistance per unit of length Rr comprised between between 50 kΩ/m and 500 kΩ/m, for example about 200 kΩ/m. In other words, the cross section and the electrical resistivity of each electrically resistive threadlike element 2r are chosen to obtain a meter of electrically resistive threadlike element 2r having an electrical resistance comprised between 10 kΩ and 10 MΩ, preferably comprised between 50 kΩ and 500 kΩ, for example about 200 kg.

For example, the electrically resistive threadlike elements 2r have electrical resistivity comprised between $10^{-6}$ Ωm and $10^{3}$ Ωm, more preferably between $10^{-4}$ Ωm and $10^{-1}$ Ωm.

Some embodiments may provide that the electrically resistive threadlike element 2r are electrically resistive wires, preferably electrically resistive yarns.

The electrically resistive yarns 2r are preferably plastic yarns (e.g. nylon) filled with electrically conductive elements (e.g. electrically conductive carbon). More preferably, the electrically resistive yarns 2r may comprise 80-denier nylon 6,6 having electrically conductive carbon suffused into its surface.

For example, a suitable electrically resistive yarn 2r may be the electrically resistive yarn available with the commercial name RESISTAT© F901, MERGE R080 that is a 80-denier nylon 6,6 monofilament which has electrically conductive carbon suffused into the surface. This particular electrically resistive yarn has a round cross section with a coating thickness of about 1 μm, and a linear mass density of about 84 denier. The electrical resistance of this electrically resistive yarn is about 0.8 $10^{5}$Ω per centimeter (i.e. about 80 kΩ/m).

Some embodiments may provide that the electrically resistive threadlike element 2r are a trace of electrically resistive material arranged along a substantially linear path. Traces of electrically resistive material may be produced for example including a biopolymer (such as microbial cellulose, microbial collagen, cellulose/chitin copolymer, microbial silk, or a mixture thereof) with electrically conductive material (such as carbonaceous material, preferably selected from the group consisting of activated carbon, high surface area carbon, graphene, graphite, activated charcoal, carbon nanotubes, carbon nanofibers, activated carbon fibers, graphite fibers, graphite nanofibers, carbon black and mixtures thereof). A preferred embodiment provides that the biopolymer is microbial cellulose.

For example, electrically conductive material may be provided to the biopolymer (e.g., to a biopolymer layer or trace) by printing (e.g., screen printing and/or digital printing), or by localized impregnation.

According to an embodiment, a culture containing biopolymer-producing microorganisms comprises electrically conductive material. For example, the support layer may be contacted with a culture including biopolymer-producing microorganisms and an electrically conductive material. The microorganisms may be cultured to produce a biopolymer including electrically conductive material, so that the support layer is provided with a trace of electrically resistive material made of biopolymer comprising electrically conductive material.

A suitable process for producing patterns, or traces, of electrically resistive material by means of biopolymer is described in the European patent application No. EP18197348.8 in the name of the present Applicant, having the following title: "A PROCESS FOR PROVIDING A TEXTILE WITH ELECTRICAL CONDUCTIVITY PROPERTIES", the content of which is incorporated herein by reference as if set forth in its entirety.

Even if the embodiments of FIGS. 1-5 show a support layer 1 comprising a plurality of sensing threadlike elements 2, wherein all the sensing threadlike elements 2 are electrically resistive threadlike elements 2r, other embodiments may provide that sensing threadlike elements 2 comprise one or more electrically conductive threadlike elements (i.e. sensing threadlike elements having electrical resistance per unit of length less than 200 Ω/m, preferably less than 50 Ω/m, more preferably less than or equal to about 10 Ω/m), as well as the plurality of electrically resistive threadlike elements 2r. Preferably, the number of the electrically resistive threadlike elements 2r is different from 50% of the number of the sensing threadlike elements 2. Some embodiments provide that sensing threadlike elements 2 comprise a plurality of electrically conductive threadlike elements and a plurality of electrically resistive threadlike elements and that the number of electrically conductive threadlike elements is different from the number of electrically resistive threadlike elements. For example, the electrically resistive threadlike elements 2r may be more than 50% of the plurality of sensing threadlike elements 2, preferably more than 80%, more preferably all the sensing threadlike elements 2 are electrically resistive threadlike elements 2r. Sensing threadlike elements 2 are configured to be electrically connected to a detection device 5 for evaluating the capacitance value Cr of each sensing threadlike element 2. Preferably, the capacitive touch sensor 10 comprises the detection device 5, and each sensing threadlike element 2 is electrically connected at one of its ends to the detection device 5 for example by connections having ideally zero resistance (such as electrically conductive yarns or wires).

The detection device 5 is provided with a plurality of input reading nodes 9 configured to be electrically connected to the sensing threadlike elements 2 (each input reading node 9 is associated to a respective sensing threadlike element 2). The detection device 5 is preferably configured to provide an output signal S_OUT comprising the values of a direct or indirect measurement of the capacitance value C of each sensing threadlike element 2 electrically connected to the correspondent input reading node 9. For example the output signal S_OUT may provide an output array data structure storing the values of a direct or indirect measurement of the capacitance value C of each sensing threadlike element 2. Each value of the output array data structure is identified by an array index associated to a corresponding sensing threadlike element 2.

The output signal S_OUT is preferably updated with a predetermined cadency having a refresh period (e.g. some milliseconds) during which the capacitance values C of the sensing threadlike elements 2 is reevaluated for updating the values of the output array data structure.

When a capacitance value of the output data array structure overcomes a determined threshold value means that a touch event occurred in the sensing threadlike element 2 associated to the corresponding array index.

With respect to FIG. 1, sensing threadlike elements 2 comprise a first array 2rx of electrically resistive threadlike elements 2r preferably arranged parallel to each other along a direction X. This embodiment allows the capacitive touch sensor 10 to implement a swipe sensor able to detect the swipe direction of a touch event on two directions X and Y (with Y is orthogonal to X).

The array index of an electrically resistive threadlike element 2r on which a touch event is detected indicates the position along the Y direction (i.e. the coordinate along an Y axis) on which the touch event occurred. A swipe direction of a touch event along the Y direction can be recognized by a change over time of the array indexes associated to the electrically resistive threadlike elements on which a touch event is detected. Furthermore, as explained above, as long as the capacitance value C of an electrically resistive threadlike element 2r is greater than a threshold value, an increase over time of the capacitance value C means that a touch event occurred with a swipe direction (along the X direction) towards the input reading node 9. Analogously, the decrease of the capacitance value C of an electrically resistive threadlike element 2r means that the swipe direction of a touch event occurred toward the opposite direction, i.e. away from the input reading node 9.

Even if the embodiment of the capacitive touch sensor 10 shown in FIG. 1 comprises a plurality of electrically resistive threadlike elements 2r arranged parallel to each other, other embodiments may provide different arrangements of the electrically resistive threadlike elements 2r still remaining within the scope of protection of the present invention. For example, some embodiments may provide that electrically resistive threadlike elements 2r are arranged radially with respect to a central point. These embodiments may provide that the end of each electrically resistive threadlike element 2r facing to the central point is configured to be electrically connected to the detection device 5, or that the opposite end to the central point of each electrically resistive threadlike element 2r is configured to be electrically connected to the detection device 5.

Figure 2:
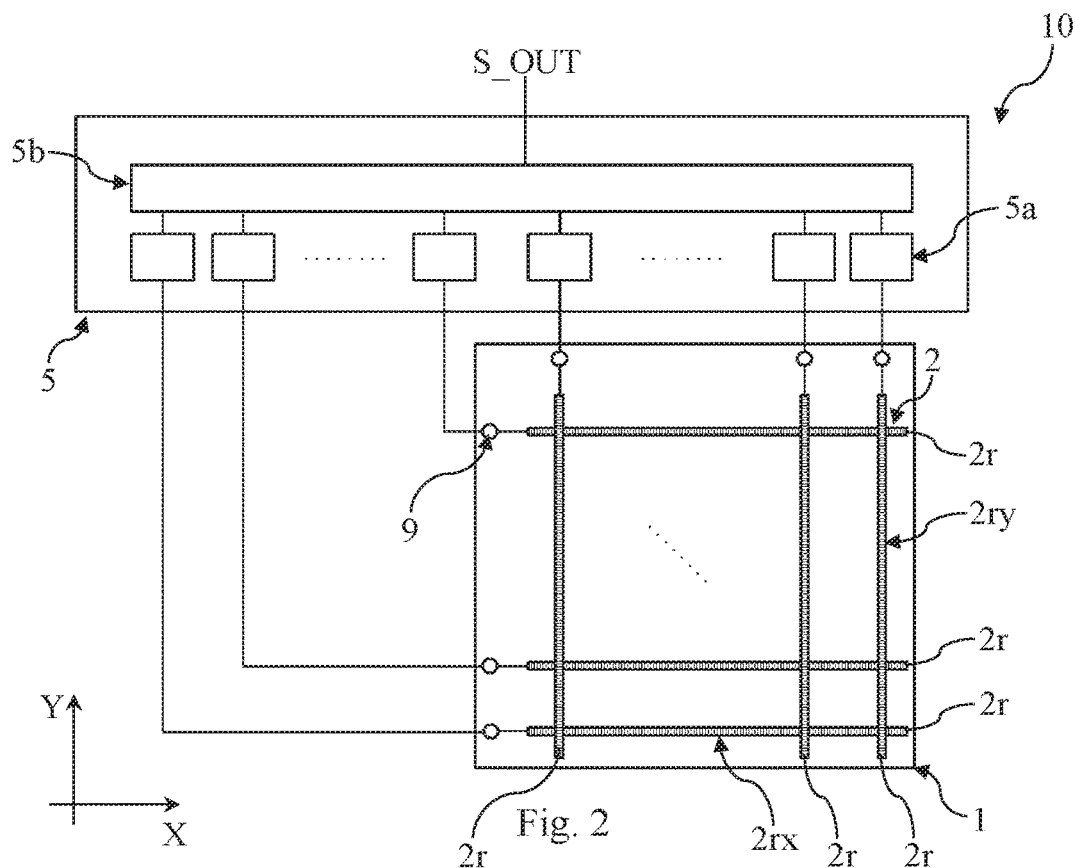

FIG. 2 shows a further embodiment of a capacitive touch sensor 10 according to the present invention. The capacitive touch sensor 10 shown in FIG. 2 comprises a first array 2rx of electrically resistive threadlike elements 2r arranged parallel to each other along a first direction X and a second array 2ry of electrically resistive threadlike elements 2r arranged parallel to each other along a second direction Y. Preferably the first direction X is orthogonal to the second direction Y.

The first array 2rx of electrically resistive threadlike elements 2r and the second array 2ry of electrically resistive threadlike elements 2r preferably overlap to form a grid. In particular, the embodiment shown in FIG. 2 provides that the electrically resistive threadlike elements 2r of the first array 2rx are electrically insulated from the electrically resistive threadlike elements 2r of the second array 2ry at the crossing there between.

Preferably, each electrically resistive threadlike element 2r may form a core of a sheathed threadlike element having a sheath formed for example by an electrically non-conductive material. Some embodiments may provide that each electrically resistive threadlike element 2r is an electrically resistive yarn provided with a sheath formed by an electrically non-conductive yarn having an electrical resistance per unit of length Rn greater than 100 MΩ/m, more preferably greater than 1 GΩ/m. For example, the sheath may comprise staple fibers made of an electrically non-conductive material, preferably having electrical resistivity greater than $10^3$ Ωm, more preferably greater than $10^6$ Ωm.

Some embodiments may provide that each electrically resistive yarn 2r is core-spun with the staple fibers of the sheath. Some embodiments may provide that each electrically resistive yarn 2r is embroidered around, i.e. it is covered, with the staple fibers of the sheath, or covered by other sheathing processes known in the art. The staple fibers are preferably natural fibers such as cotton, wool, silk and the like. These embodiments allow the capacitive touch sensor 10 to detect the position of a touch event as X, Y coordinates on the capacitive grid. In particular, the position of a touch event is determined by the detection device 5 by detecting which electrically resistive threadlike elements 2r of the first array 2rx and of the second array 2ry (i.e. which rows and columns) of the capacitive grid are touched.

According to an aspect of the present invention, number and arrangement of the electrically resistive threadlike elements 2r are chosen so that when a touch event occurs on the capacitive grid defined by the electrically resistive threadlike elements 2r, at least one electrically resistive threadlike element 2r of the first array 2rx and at least one electrically resistive threadlike element 2r of the second array 2ry are touched.

In other words, the skilled person, knowing the average size of the capacitive grid portion touched by the objects intended to be used (e.g. a finger of a user, a tip of a touch pen), is able to choose the number and the arrangement of electrically resistive threadlike elements 2r so that when an object touches the capacitive grid, at least one electrically resistive threadlike element 2r of the first array 2rx and at least one electrically resistive threadlike element 2r of the second array 2ry are touched. Analogously to the embodiment shown in FIG. 1, the detection device 5 is configured to evaluate the capacitance values C of the first and second array 2rx, 2ry of electrically resistive threadlike elements 2r.

The output signal S_OUT comprises output values OUTx, OUTy (preferably in form of output data array structure) that are function of the capacitance values of each electrically resistive threadlike elements 2r (for example a direct or indirect measurement of the capacitance).

As explained above, the array indexes of electrically resistive threadlike elements 2r on which a touch event is detected (i.e. the indexes associated to the capacitance values that overcome a determined threshold value) indicates the coordinates along the X and Y direction on which the touch event occurred. Furthermore, the value of the capacitance C of each electrically resistive threadlike element 2r of the first array 2rx provides an indication of the position of a touch event along the first direction X with respect to the position of the reading node 9. Analogously, the value of the capacitance C of each electrically resistive threadlike element 2r of the second array 2ry provides an indication of the position of a touch event along the second direction Y with respect to the position of the reading node 9.

The capacitance values of each electrically resistive threadlike elements 2r allow to distinguish the indexes associated to the electrically resistive threadlike elements 2r of the first array 2rx and of the second array 2ry when two or more touch events occurred on the capacitive grid. As a result, the detection device 5 can detect multi-touch events by the "Self-Capacitance Sensing" technique without "ghosting" or misplaced location problems.

Figure 3:
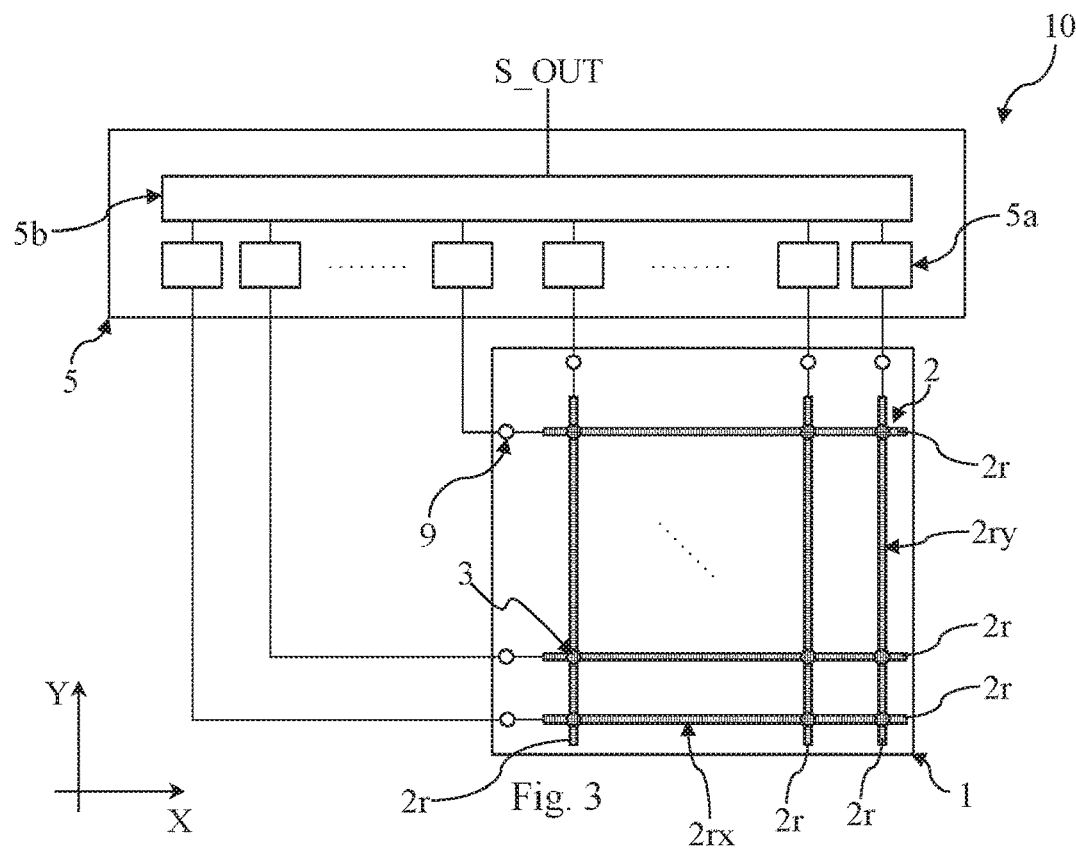

FIG. 3 shows a further embodiment of a capacitive touch sensor 10 according to the present invention. The capacitive touch sensor 10 shown in FIG. 3 comprises a first array 2rx of electrically resistive threadlike elements 2r arranged parallel to each other along a first direction X and a second array 2ry of electrically resistive threadlike elements 2r arranged parallel to each other along a second direction Y. Preferably the first direction X is orthogonal to the second direction Y.

The first array 2rx of electrically resistive threadlike elements 2r and the second array 2ry of electrically resistive threadlike elements 2r preferably overlap to form a grid. In particular, the embodiment shown in FIG. 3 provides that the electrically resistive threadlike elements 2r of the first array 2rx of the second array 2ry are electrically shorted at the crossing 3 there between.

Thanks to this embodiment, the electrically resistive threadlike elements 2r forms an electrically resistive grid having a capacitance value evaluated at a plurality of input reading nodes 9, wherein each reading node is electrically connected to an end of each correspondent electrically resistive threadlike element 2r.

The capacitance values C evaluated at each input reading node 9 are indicative of the distance of a touch event occurred on the grid of electrically resistive threadlike elements 2 with respect to the correspondent input reading node.

By means of triangulation techniques known in the art, the location of a touch event occurred on the grid of electrically resistive threadlike elements 2r can be calculated on the basis of the capacitance values C evaluated at the input reading nodes 9.

As a result, even if one or more electrically resistive threadlike elements 2r are broken (e.g. due to a damage caused to the support layer 1) the capacitive touch sensor 10 can detect a touch event occurred in the portion of grid wherein the electrically resistive threadlike elements are broken by calculating the location of the touch event from the capacitance values of the other electrically resistive threadlike elements evaluated at the corresponding input reading nodes.

The capacitance value C may be evaluated for example by measuring the charging time, or the oscillation frequency of an oscillator, or by other measuring technics known in the art.

Some embodiments may provide that the detection device 5 comprises a front-end circuit 5a having a plurality of input reading nodes 9 (for example the front-end circuit 5a may comprise a plurality of front-end blocks, wherein each reading node 9 is associated to a corresponding input reading node 9).

For example, the front-end circuit 5a may comprise at least one oscillator (e.g. a Colpitts oscillator). Each electrically resistive threadlike element 2r is connected to the oscillator that has (in absence of a touch event) a predetermined oscillation frequency. A change of the capacitance value C of an electrically resistive threadlike elements 2r is detected as a change of the oscillation frequency of the oscillator. In other words, by evaluating the oscillation frequency of the oscillator, the capacitance value C of each electrically resistive threadlike element 2r can be evaluated.

Preferably, the detection device 5 comprises a microcontroller 5b connected to the front-end circuit 5a, and configured to calculate the capacitance values C of each electrically resistive threadlike elements 2r on the basis of the oscillation frequency of the oscillator.

Figure 4:
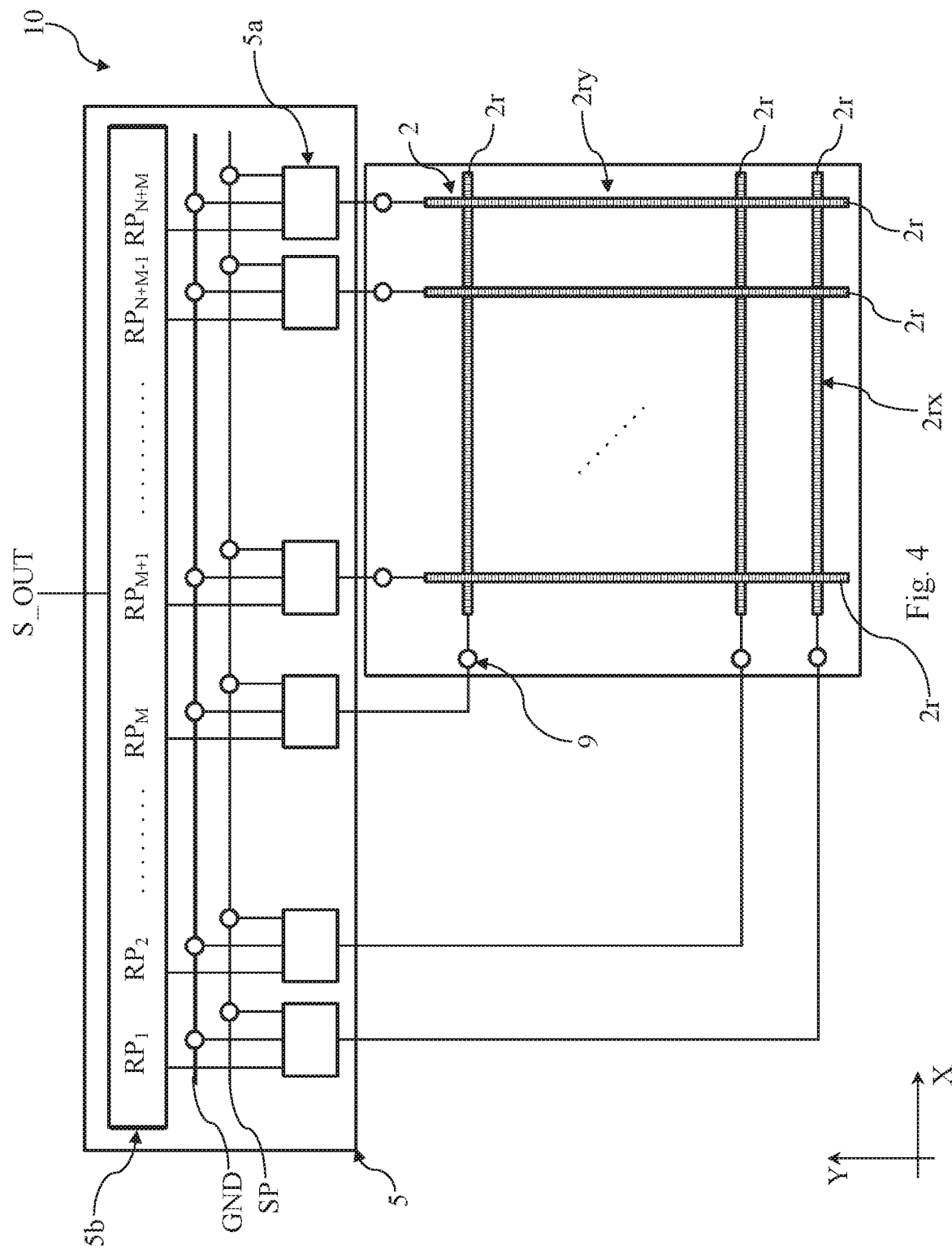

As shown in FIG. 4, some embodiments may provide that the detection device 5 is configured to provide a forward signal (e.g. a Boolean signal) to a forward terminal SP of the front-end circuit 5a.

The detection device 5 comprises a microcontroller 5b (for example the forward signal may be provided by the microcontroller 5b) electrically connected to the front-end circuit 5a at a returning terminal RP. Preferably, each electrically resistive threadlike element 2r is electrically connected to a front-end block of the front-end circuit 5a that is connected to a respective return terminal RP of the microcontroller 5b. For example, the embodiment shown in FIG. 4 provides M returning terminals $RP_1$, $RP_2$, . . . $RP_M$ associated to the M electrically resistive threadlike elements 2r of the first array 2rx, and N returning terminals $RP_{M+1}$, $RP_{M+2}$, $RP_{M+N}$ associated to the N electrically resistive threadlike elements 2r of the second array 2ry.

Figure 5:
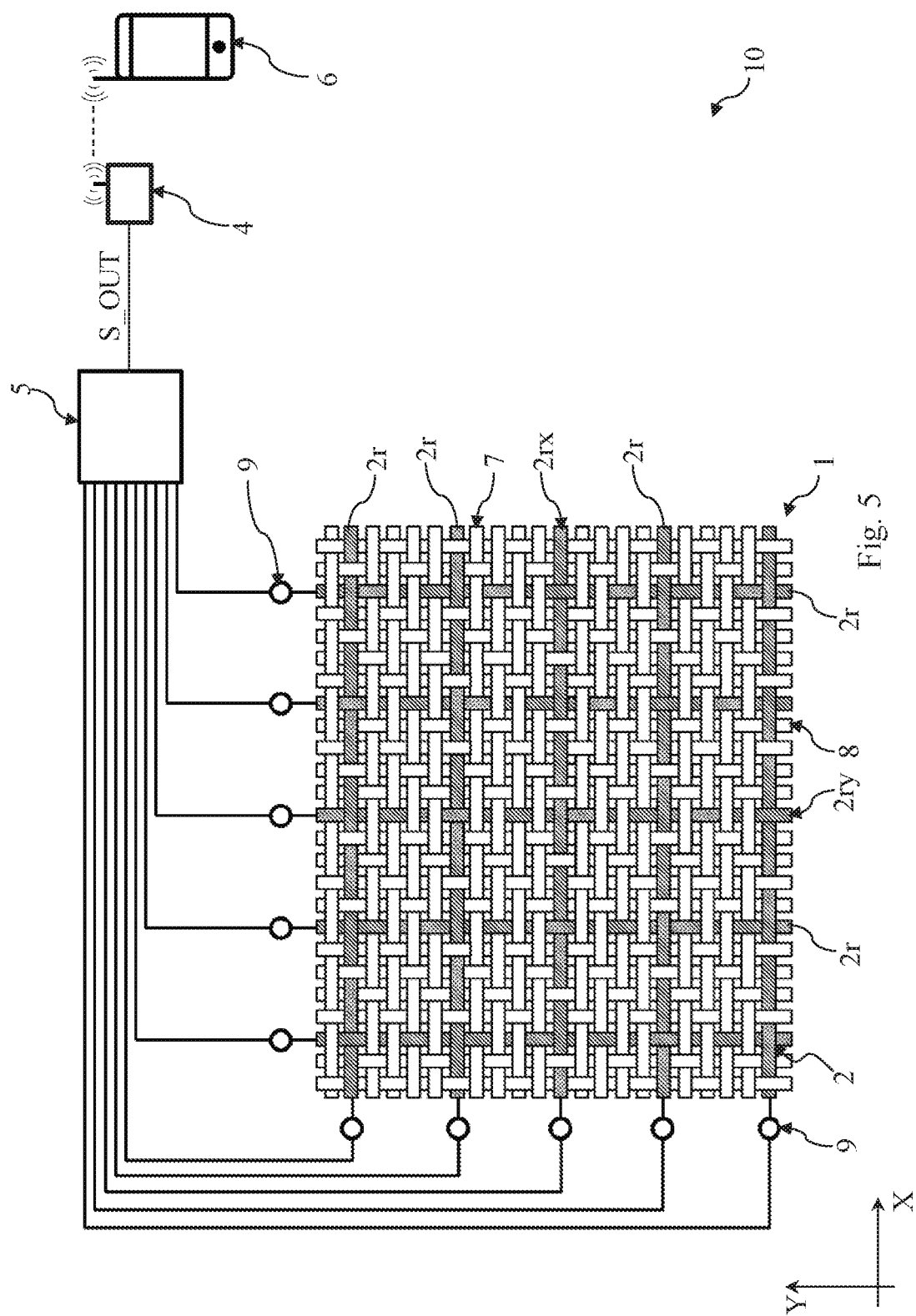

The front-end circuit 5a provides a return signal to the microcontroller 5b for each electrically resistive threadlike element 2r. Each returning signal has a delay with respect to the forward signal that is a function of the charging time of the capacitance of the electrically resistive threadlike element 2r associated to the respective returning terminal. The microcontroller 5b is preferably configured to measure the delay between forward and returning signal in order to calculate the capacitance value C of each electrically resistive threadlike element 2r on the basis of the delay. Sensing threadlike elements 2 may be wires, preferably yarns coupled to a fabric 1 by sewing, by knitting, by weaving, or by any other coupling technique known in the art. FIG. 5 shows an exemplary embodiment of a capacitive touch sensor 10 according to the present invention wherein the support layer 1 is a woven fabric and wherein electrically resistive threadlike elements 2r are electrically resistive yarns 2r forming at least part of the weft 7 and of the warp 8 of the woven fabric 1. In particular, electrically resistive yarns 2r of a first array 2rx form part of the weft 7 of the woven fabric 1, and electrically resistive yarns 2r of a second array 2ry form part of the warp 8 of the woven fabric 1.

Further embodiments may provide that sensing threadlike elements 2 are sensing yarns 2 forming at least part of the weft or of the warp of a woven fabric 1, for example in the case of a capacitive touch sensor 10 implementing a swipe sensor as shown in FIG. 1, still remaining within the scope of protection of the present invention. In general, sensing threadlike elements 2 preferably form at least part of the weft and/or of the warp of a woven fabric 1.

With respect to FIG. 5, the detection device 5 is preferably connected to a communication module 4 configured to transmit the output signal S_OUT to an external device 6.

The capacitive touch sensor 10 of the present invention may be used for controlling or sending a control command to an external device 6. Preferably, the communication module 4 is a wireless communication module (e.g. Bluetooth module, WiFi module, Infrared module, and the like).

The capacitive touch sensor 10 may be coupled to the fabric 1 of an article for providing a sensing region that allows the user to control an external device 6 in a simple and reliable way.

Some embodiments may provide that the that the touch sensor 10 is coupled to a fabric 1 of a garment, preferably a shirt, a jacket or a pair of pants, on a sensing region (for example the cuff of a shirt, a sleeve of a jacket, or a pant leg) for allowing the wearer to control an external device 6 (e.g. a smartphone, a music player, or the like) easily.

Some embodiments may provide that the touch sensor 10 is coupled to a fabric 1 for lining a seating furniture (preferably a sofa or an armchair) on a sensing region (e.g. on the arms of the seating furniture) for allowing the sitting user to control an external device 6 (e.g. a smart TV, a stereo or the like) easily.

Summarizing, a method for detecting a touch event on a support layer 1 comprises the following steps:
 (a) providing a capacitive touch sensor 10 according to anyone of the embodiments described above;
 (b) evaluating the capacitance C of each sensing threadlike elements 2 of the capacitive touch sensor 10;
 (c) providing an output signal S_OUT comprising one or more output values OUTx, OUTy that are a function of the capacitance C evaluated in the step (b).

Preferably, the step (b) comprises a direct or indirect measuring of the capacitance value C of each sensing threadlike elements 2.

Some embodiments may provide that the method comprises a step of transmitting the output signal S_OUT to an external device 6.

The invention claimed is:

1. A capacitive touch sensor (10) comprising a support layer (1) having a plurality of sensing threadlike elements (2) configured to be electrically connected to a detection device (5) for evaluating the capacitance value (C) of each sensing threadlike element (2) of said plurality of sensing threadlike elements, characterized in that said sensing threadlike elements (2) comprise a plurality of electrically resistive threadlike elements (2r), the detection device (5) being provided with a plurality of input reading nodes (9), each input reading node (9) being associated to a respective sensing threadlike element (2), wherein the electrical resistance per unit of length of each electrically resistive threadlike element (2r) is comprised between 10 kΩ/m and 10 MΩ/m and wherein the electrically resistive threadlike elements (2r) are plastic yarns filled with electrically conductive elements, said plurality of sensing threadlike elements (2) comprising a first array (2rx) of electrically resistive threadlike elements (2r) arranged parallel to each other and a second array (2ry) of electrically resistive threadlike elements (2r) arranged parallel to each other and orthogonal to the electrically resistive threadlike elements (2r) of said first array (2rx), wherein the first array (2rx) and the second array (2ry) of electrically resistive threadlike elements (2r) overlap to form a grid and wherein the electrically resistive threadlike elements (2r) of said first array (2rx) and of said second array (2ry) are electrically shorted at the crossing (3) therebetween.

2. The capacitive touch sensor (10) according to claim 1, wherein said electrically resistive threadlike element (2r) comprise at least a trace of electrically resistive material arranged along a substantially linear path.

3. The capacitive touch sensor (10) according to claim 2, wherein said traces of electrically resistive material comprise a biopolymer including electrically conductive carbonaceous material.

4. The capacitive touch sensor (10) according to claim 1, wherein the number of said plurality of electrically resistive threadlike elements (2r) is different from 50% of the number of said sensing threadlike elements (2), said electrically resistive threadlike elements (2r) being more than 50% of said plurality of sensing threadlike elements (2).

5. The capacitive touch sensor (10) according to claim 1, wherein said electrically resistive threadlike elements (2r) are more than 80% of said plurality of sensing threadlike elements (2), wherein all the sensing threadlike elements (2) are electrically resistive threadlike elements (2r).

6. The capacitive touch sensor (10) according to claim 1, wherein said support layer (1) is a fabric.

7. The capacitive touch sensor (10) according to claim 6, wherein said support layer (1) is a woven fabric, and wherein said plurality of sensing threadlike elements (2) form at least a part of the weft (7) and/or of the warp (8) of said woven fabric (1).

8. The capacitive touch sensor (10) according to claim 1, wherein said plurality of electrically resistive threadlike elements (2r) are electrically resistive wires, or electrically resistive yarns, or electrically resistive traces.

9. The capacitive touch sensor (10) according to claim 1, wherein each sensing threadlike element (2) is electrically connected at one of its ends to said detection device (5).

10. The capacitive touch sensor (10) according to claim 1, wherein said detection device (5) is configured to provide an output signal (S_OUT) that indicates the direct or indirect measurement of the capacitance value (C) of each sensing threadlike element (2).

11. The capacitive touch sensor (10) according to claim 10, wherein said detection device (5) is electrically connected to a communication module (4) configured to transmit said output signal (S_OUT) to an external device (6).

12. An article comprising a capacitive touch sensor (10) according to claim 1.

13. A method for detecting a touch event on a support layer (1) comprising the following steps:
 (a) providing a capacitive touch sensor (10) according to claim 1;
 (b) evaluating the capacitance (C) of each sensing threadlike element (2) of said touch sensor (10);
 (c) providing an output signal (S_OUT) comprising one or more output values (OUTx, OUTy) that are a function of said capacitance (C) evaluated in said step (b).

14. The method according to claim 13, wherein said step (b) comprises a direct or indirect measuring of the capacitance value (C) of each sensing threadlike element (2).

15. The method according to claim 13, comprising a step of transmitting said output signal (S_OUT) to an external device (6).

16. The capacitive touch sensor (10) according to claim 3, wherein said electrically conductive carbonaceous material is selected from the group consisting of activated carbon, high surface area carbon, graphene, graphite, activated charcoal, carbon nanotubes, carbon nanofibers, activated carbon fibers, graphite fibers, graphite nanofibers, carbon black and mixtures thereof.

17. A capacitive touch sensor (10) comprising a support layer (1) having a plurality of sensing threadlike elements (2) configured to be electrically connected to a detection device (5) for evaluating the capacitance value (C) of each sensing threadlike element (2) of said plurality of sensing threadlike elements, characterized in that wherein said sensing threadlike elements (2) comprise a plurality of electrically resistive threadlike elements (2r), wherein the electrical resistance per unit of length of each electrically resistive threadlike element (2r) is comprised between 10 kΩ/m and 10 MΩ/m and wherein the electrically resistive threadlike elements (2r) are plastic yarns filled with electrically conductive elements wherein said detection device (5) comprises a front-end circuit (5a) having at least one oscillator, wherein each electrically resistive threadlike element (2r) is connected to the oscillator, said detection device (5) being configured to detect a change of the capacitance value (C) of an electrically resistive threadlike elements (2r) as a function of a change of the oscillation frequency of the oscillator, the detection device (5) being provided with a plurality of input reading nodes (9), each input reading node (9) being associated to a respective sensing threadlike element (2), said plurality of sensing threadlike elements (2) comprising a first array (2rx) of electrically resistive threadlike elements (2r) arranged parallel to each other and a second array (2ry) of electrically resistive threadlike elements (2r) arranged parallel to each other and orthogonal to the electrically resistive threadlike elements (2r) of said first array (2rx), wherein the first array (2rx) and the second array (2ry) of electrically resistive threadlike elements (2r) overlap to form a grid and wherein the electrically resistive threadlike elements (2r) of said first array (2rx) and of said second array (2ry) are electrically shorted at the crossing (3) therebetween.

\* \* \* \* \*